(12) United States Patent
Wan et al.

(10) Patent No.: US 7,975,605 B2
(45) Date of Patent: Jul. 12, 2011

(54) FOOD PROCESSING DEVICE

(75) Inventors: Yiu Chung Wan, Hong Kong (CN); Lance Logan Hood, Seattle, WA (US)

(73) Assignee: Kwok Kuen So, Hong Kong (HK)

( * ) Notice: Subject to any disclaimer, the term of this patent is extended or adjusted under 35 U.S.C. 154(b) by 713 days.

(21) Appl. No.: 12/037,166

(22) Filed: Feb. 26, 2008

(65) Prior Publication Data

US 2008/0210103 A1 Sep. 4, 2008

(30) Foreign Application Priority Data

Mar. 1, 2007 (EP) .................................... 07250871

(51) Int. Cl.
*A23L 1/00* (2006.01)
(52) U.S. Cl. ................................ 99/495; 99/522; 34/58
(58) Field of Classification Search .................... 99/495, 99/511; 34/58, 127, 128; 210/360.1, 380.1; 74/415, 416, 417, 434, 462, 464, 465
See application file for complete search history.

(56) References Cited

U.S. PATENT DOCUMENTS

| | | | | |
|---|---|---|---|---|
| RE22,555 E | * | 10/1944 | Brooks | ............................ 74/468 |
| 2,430,129 A | * | 11/1947 | Ligh | ............................... 74/416 |
| 3,885,321 A | * | 5/1975 | Fouineteau | ......................... 34/58 |
| 4,167,127 A | * | 9/1979 | Calvert | ............................ 74/416 |
| 5,064,535 A | | 11/1991 | Hsu | |
| 5,184,544 A | | 2/1993 | Ling | |
| 5,562,025 A | | 10/1996 | Bull et al. | |
| 5,904,090 A | * | 5/1999 | Lillelund et al. | ................ 99/495 |
| 6,018,883 A | | 2/2000 | Mulhauser | |
| 6,510,785 B1 | * | 1/2003 | Margolin | ......................... 99/495 |
| 7,448,315 B2 | * | 11/2008 | Mulhauser et al. | .............. 99/495 |
| 7,669,793 B2 | | 3/2010 | So et al. | |
| 7,681,495 B2 | | 3/2010 | Wan et al. | |

FOREIGN PATENT DOCUMENTS

GB  1 481 283  7/1977

* cited by examiner

*Primary Examiner* — Reginald L Alexander
(74) *Attorney, Agent, or Firm* — Leydig, Voit & Mayer, Ltd.

(57) ABSTRACT

A food processing device, e.g. a salad spinner, has a housing with a lid, a basket supported in the housing for rotation, and a drive mechanism supported by the lid for rotating the basket to spin water from salad in the housing. The drive mechanism has a crank handle and a drive transmission system coupling the handle to the basket to transmit a rotational driving force from the handle to rotate the basket. The drive transmission system has a first rotary gear arranged to receive the rotational driving force from the handle and a second rotary gear in driving engagement with the first gear for receiving the rotational driving force from the first gear to rotate the basket. The first and second gears have corresponding serial formations, e.g., recesses and protrusions, of respective circular cross-sections that are inter-engageable, one in the other, for transmission of the driving force.

22 Claims, 8 Drawing Sheets

FOOD PROCESSING DEVICE

The present invention relates to a manually operated food processing device which operates with a rotary action.

BACKGROUND OF THE INVENTION

Food processing devices of the type concerned, such as food spinners and mixers, are commonly used in kitchens for processing food such as drying food (salad or vegetable) or mixing dressing or sauce therefor. Such processing devices are hand operated utensils. In a typical construction, they include a housing having a lid, an operating attachment such as a basket or beater supported in the housing for rotation, and a drive mechanism for rotating the attachment to process food. The drive mechanism usually incorporates a handle on a crank for turning by a user.

SUMMARY OF THE INVENTION

According to the invention, there is provided a food processing device comprising a housing having a lid, an operating attachment supported in the housing for rotation about an axis of rotation, and a drive mechanism supported by the lid for rotating the attachment to process food in the housing. The drive mechanism comprises a manually rotatable actuator and a drive transmission system provided between the actuator and the attachment to transmit rotational drive from the actuator to rotate the attachment. The drive transmission system comprises a first rotary member arranged to receive drive from the actuator and a second rotary member in drive engagement with the first rotary member for receiving drive from the first rotary member to rotate the attachment. The first and second rotary members have corresponding serial formations of respective round cross-sections that are inter-engageable one in the other for drive transmission.

Preferably, the serial formations of the two rotary members comprise recesses and protrusions respectively, the protrusions having a matching round cross-section with the recesses for fitting closely in the recesses.

More preferably, the recesses have a part cylindrical shape.

More preferably, the protrusions are dome-shaped.

Further more preferably, the protrusions have a part circular cross-section.

It is preferred that the serial formations of one of the two rotary members comprise the recesses which are arranged annually around an axis of rotation of the same rotary member and face outwardly from the axis.

It is further preferred that said one of the two rotary members is the first rotary member.

It is yet further preferred that the first rotary member comprises a shaft around which the recesses are located, the shaft having an end associated with the actuator.

In a preferred embodiment, the serial formations of one of the two rotary members comprise the protrusions which are arranged annually around an axis of rotation of the same rotary member and face to the same side of an imaginary plane extending transversely of the axis.

More preferably, said one of the two rotary members is the second rotary member.

Further more preferably, the second rotary member comprises a gearwheel having a principal side on which the protrusions are located, the gearwheel having peripheral teeth for rotating the attachment.

It is preferred that the first rotary member has a smaller number of the serial formations than the second rotary member.

It is preferred that the first and second rotary members are supported for rotation about respective axes that extend transversely relative to each other.

It is preferred that the actuator comprises a crank handle.

In a preferred embodiment, the drive mechanism includes a ratchet device in drive engagement with the drive transmission system to enable transmission of the rotational drive only in one direction from the actuator to the attachment upon the actuator rotating in one direction.

More preferably, the ratchet device comprises a ratchet member and at least one hinged pawl co-operable therewith.

Further more preferably, the ratchet member has a circular arrangement of skew teeth surrounding said at least one hinged pawl for engagement thereby under the action of centrifugal force to transmit drive only in one direction.

In a preferred embodiment, the food processing device includes a braking mechanism for braking the attachment, which braking mechanism comprises a manual operator and at least one braking member for movement by the operator to brake the attachment.

More preferably, the braking mechanism including said at least one braking member is housed inside the lid, with the operator exposed on the lid.

More preferably, said at least one braking member is resiliently biased by a spring into an inoperative position and is movable by the operator against the action of the spring to an operative position to brake the attachment.

In one embodiment, the attachment comprises a basket having a lid engageable by the drive mechanism for rotation thereby to spin off water from food in the basket.

In another embodiment, the attachment comprises an agitator engageable by the drive mechanism for rotation thereby to agitate food in the housing.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Referring to the drawings, there is shown a food processing device in the form of a salad spinner 10 embodying the invention, which includes a round bowl 100 as a housing having a circular top lid 110, and a round basket 200 as an operating attachment within the bowl 100 and supported for rotation about a vertical central axis Z. The basket 200 has its own circular lid 210. A drive mechanism 300 in the lid 110 operates to rotate the basket 200, by its lid 210, so as to spin off water from salad or the like contained in the basket 200.

The basket 200 with lid 210 is slightly smaller than the interior of the bowl 100 with lid 110 to fit loosely therein. The bottom of the basket 200 has a dented centre resting upon an upwardly pointed centre of the bottom of the bowl 100, thereby the basket 200 is located in the bowl 100. The lid 210 has an upstanding cylindrical collar 212 at its centre, for coupling with the drive mechanism 300 for rotation thereby.

The bowl lid 110 has a horizontal hollow body 111 which has an open lower side closed by a circular base cover 113, within which there are installed the drive mechanism 300 and a braking mechanism 500 for the basket 200.

The drive mechanism 300 has a manually operable actuator in the form of a crank handle 310 and includes a gear train provided between the handle 310 and the basket 200 via a ratchet device 400, that being part of the drive mechanism 300.

The lid body 111 has an aperture 112 on one side through which a short horizontal shaft 311 extends inwardly and is supported thereby for rotation about its central axis X, in either directions by the crank handle 310.

The gear train is formed by a series of three rotary gear members or gears 320, 330 and 340 that are mounted for rotation about respective horizontal axis X and vertical axes Y and Z. The first (leading) gear 320 is provided by an inner end of the horizontal shaft 311 (called "shaft gear"), whose opposite end is connected with the crank handle 310 for rotation therewith i.e. receiving rotational drive therefrom. The third (trailing) gear 340 is a pinion 340 upstanding centrally on a horizontal crossbar 421 of the ratchet device 400. The second (intermediate) gear 330 comprises a horizontal flat gearwheel 330 which has teeth around its peripheral in drive engagement with that of the pinion 340 for rotating the basket 200.

The first and second gears 320 and 330 are in mesh for drive transmission from the former to the latter, having individual serial formations of respective round cross-sections that are inter-engageable one in the other. Such serial formations of the first gear 320 are a series of six recesses 321 which are formed annually and evenly around the inner end of the shaft 311 and they face radially outwardly from the shaft axis X. The serial formations of the second gear 330 comprise a series of twelve protrusions 331 which are formed on the upper principal surface of the gearwheel 330 annually and evenly around the gearwheel axis Y, facing to the same upper side of an imaginary plane extending transversely of the axis Y.

In general, the protrusions 331 are made to have a round cross-section that matches with a complementarily shaped round cross-section of the recesses 321 such that the protrusions 331 fit closely in the recesses 321, with intimate contact along their interface. This ensures a sufficiently tight, firm and reliable inter-engagement between the first and second gears 320 and 330 for drive transmission.

Each recess 321 has a part-cylindrical shape extending lengthwise in the direction of axis X, having a round inner end and an open outer end. The protrusions 331 are oval dome-shaped and each resembles half an egg lying flat on the gearwheel 330, having a principal axis (of symmetry) extending radially about axis Y and having a round (spherical) outer end and a less round or slightly tapered (prolate) inner end.

The cross-section of each recess 321 taken transversely of its longitudinal axis (i.e. transversely of axis X) is semi-circular. The cross-section of each protrusion 331 taken transversely of its principal axis (i.e. transversely of radial direction from axis Y) is also semi-circular and of substantially the same diameter such that each protrusion 331 can match with and close fit within the associated recess 321 for a firm inter-engagement.

As there are less recesses 321 than protrusions 331 (i.e. six compared with twelve by number), the transmission of drive from the shaft gear 320 to the gearwheel 330 is speed reducing, by precisely half. Such an effect on speed is, however, overturned by the gearwheel 330 having significantly more teeth than the pinion 340 (i.e. seventy-two to ten). Accordingly, the overall gear train has a net effect of increasing speed.

The ratchet device 400 is located centrally on the lid base cover 113. It is implemented by a horizontal circular rotary disc 410 having a recessed upper side, within which there is arranged a pair of pawls 420 hinged for free pivotal movement about respective vertical axes through opposite ends of the crossbar 421. The crossbar 421 and the pawls 420 carried thereby are arranged symmetrically about the central axis Z for free rotation, and so is the disc 410. The disc 410 is formed with a circular arrangement of inclined or skew teeth 411 which extend around the inner side of disc's periphery, surrounding the pawls 420 for ratchet engagement thereby in anti-clockwise direction (see FIG. 10).

The ratchet disc 410 includes a central tubular socket 412 which extends downwardly through a center hole of the lid base cover 113. The socket 412 has its lower end notched on opposite sides to introduce a certain degree of resilience so that it can be snap-fitted into the collar 212 of the basket lid 210, whereby the lid 210 and hence the basket 200 is coupled with the disc 410 for rotation simultaneously with the disc 410, the disc 410 acting as a drive member of the drive mechanism 300.

Figure 8:
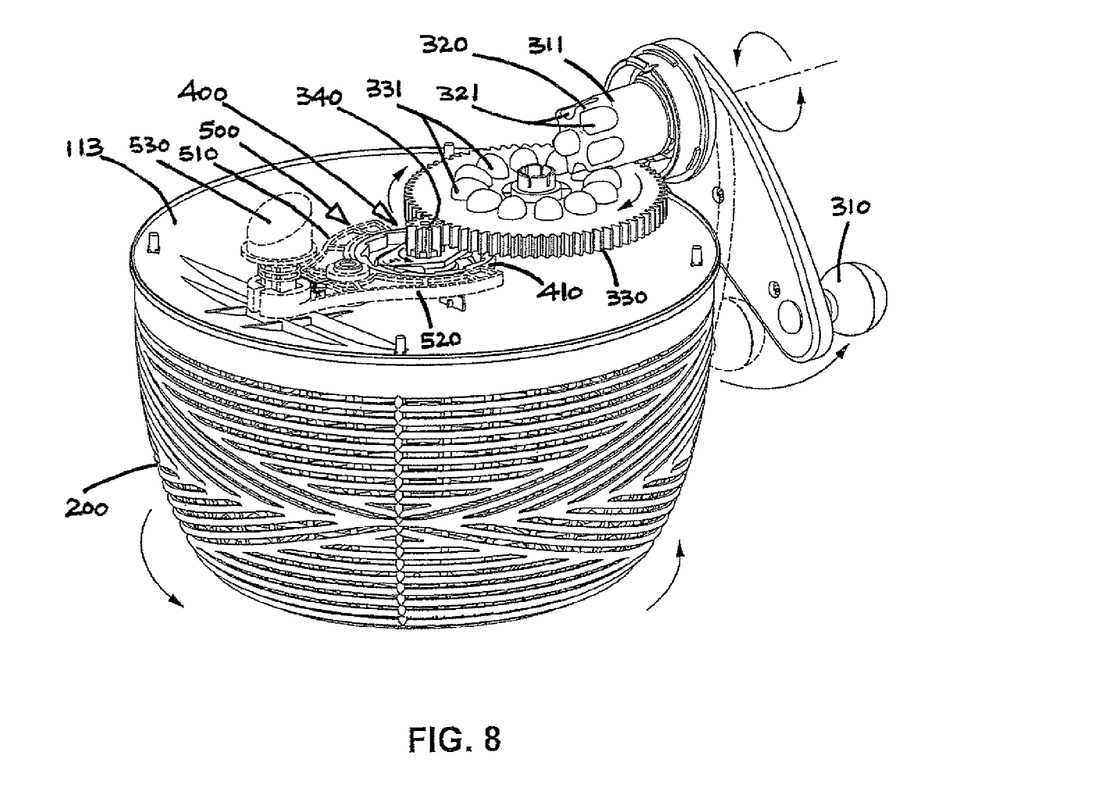
FIG. 8 is a perspective view of the salad spinner of FIG. 7, showing some components that are for driving the salad spinner to spin and for braking.
Figure 9:
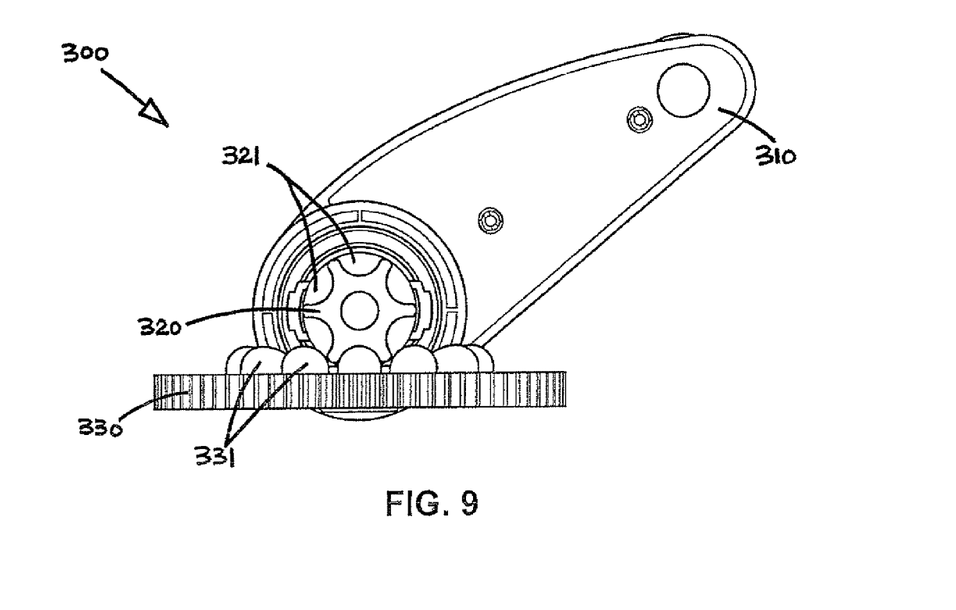
FIG. 9 is a side view of a crank handle and gearwheel of FIG. 8 as driving components for the salad spinner to spin.

The crank handle 310 may be turned in either direction, and the resulting rotation will be speeded up and transmitted via the trailing gear member 340 to the pawls 420 of the ratchet device 400. However, the rotational drive will be transmitted by the ratchet device 400 (to the basket 200) only when the handle 310 is turned clockwise as indicated in FIGS. 8 and 10.

Figure 1:
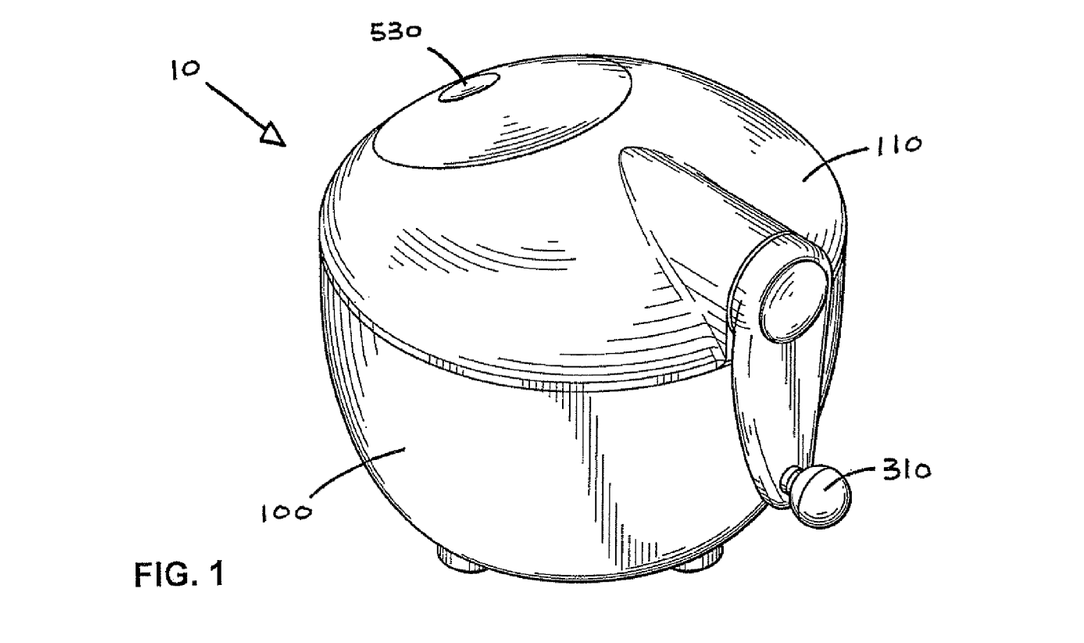
FIG. 1 is a front perspective view of an embodiment of a food processing device, in the form of a salad spinner, in accordance with the invention.
Figure 2:
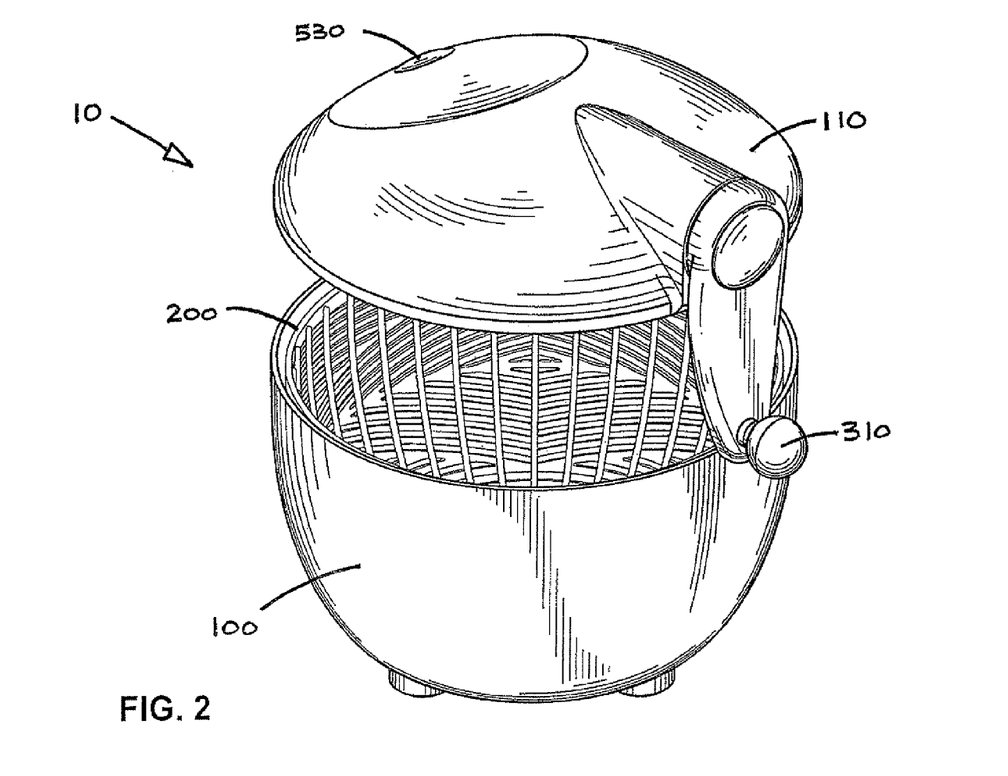
FIG. 2 is a front perspective view similar to FIG. 1, showing a lid of the salad spinner lifted open.
Figure 3:
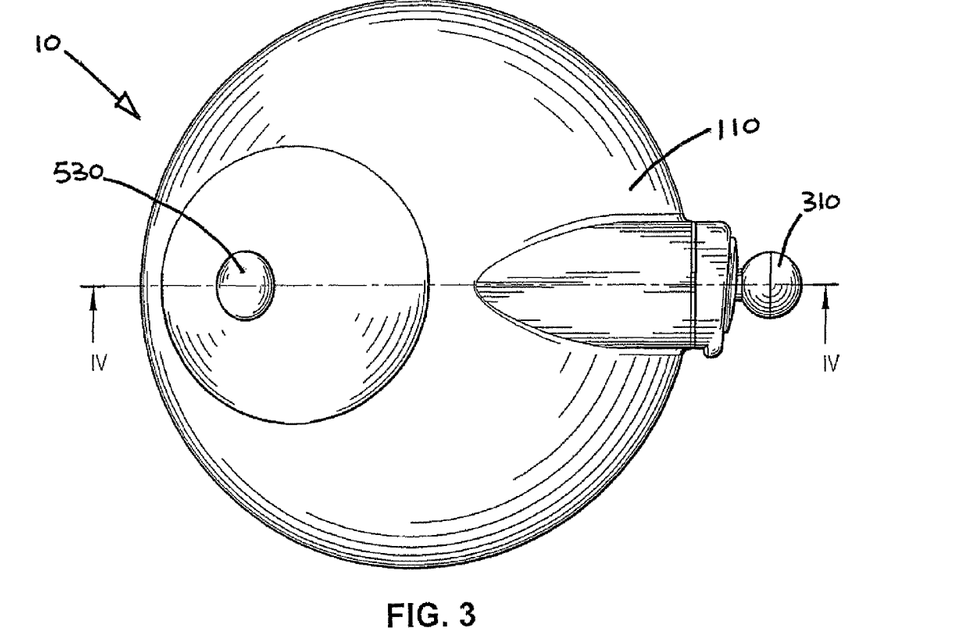
FIG. 3 is a top plan view of the salad spinner of FIG. 1.
Figure 4:
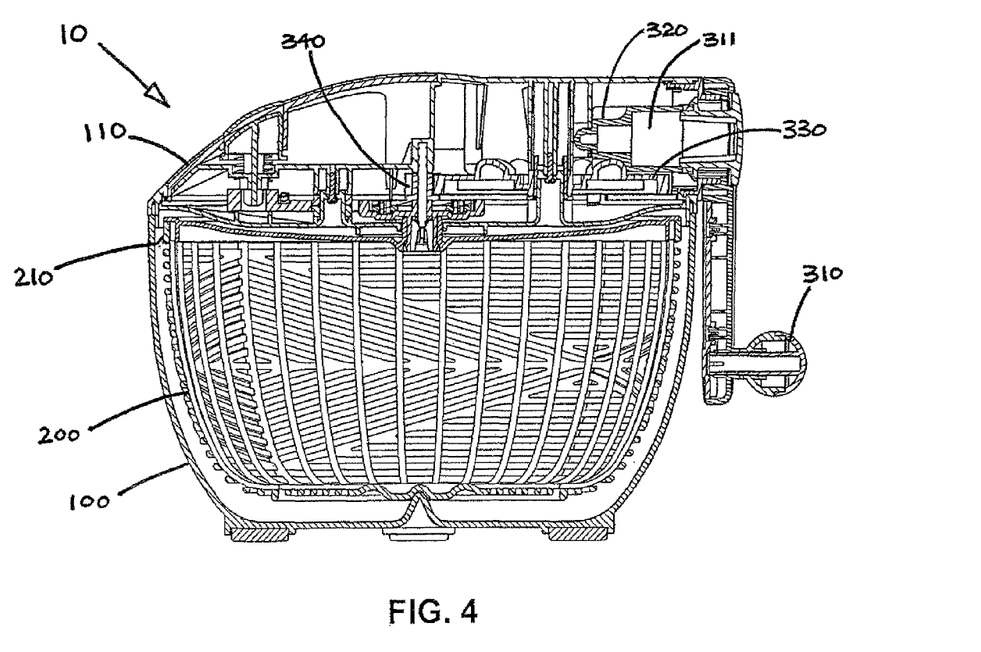
FIG. 4 is a cross-sectional side view of the salad spinner of FIG. 3, taken along line IV-IV.
Figure 5:
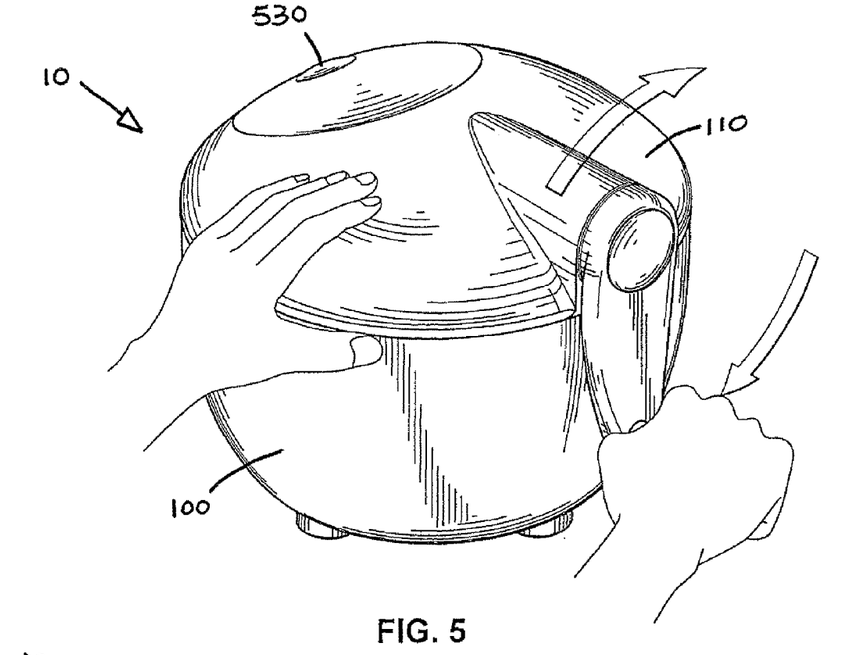
FIG. 5 is a front perspective view similar to FIG. 1, showing how the salad spinner is operated by a user.
Figure 6:
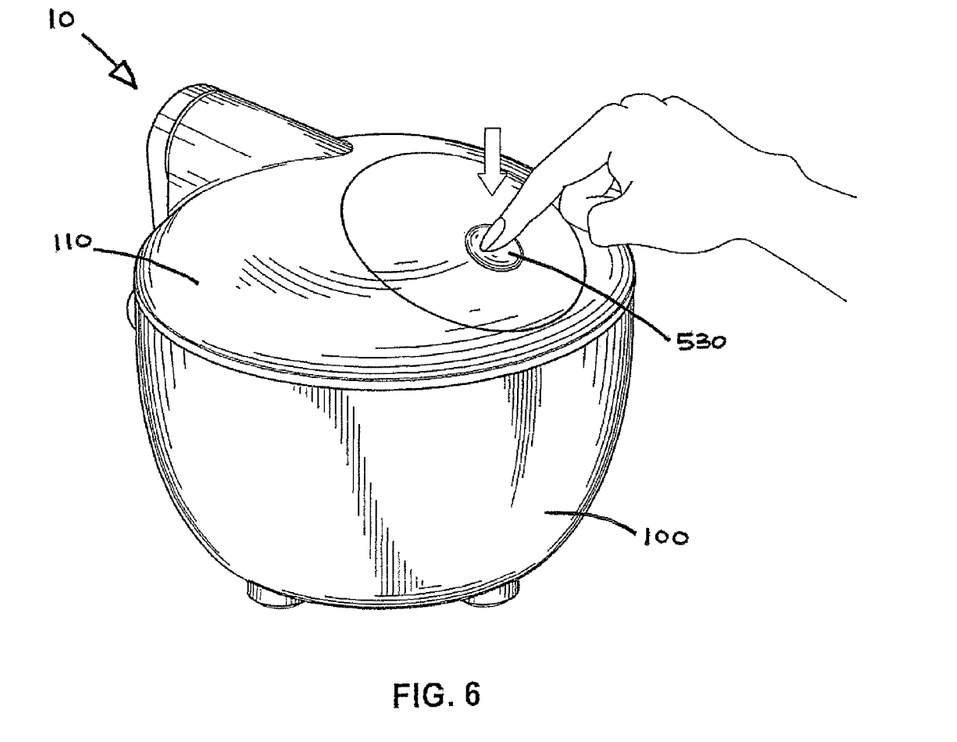
FIG. 6 is a rear perspective view of the salad spinner of FIG. 5, showing how spinning of the salad spinner is braked by a user.
Figure 7:
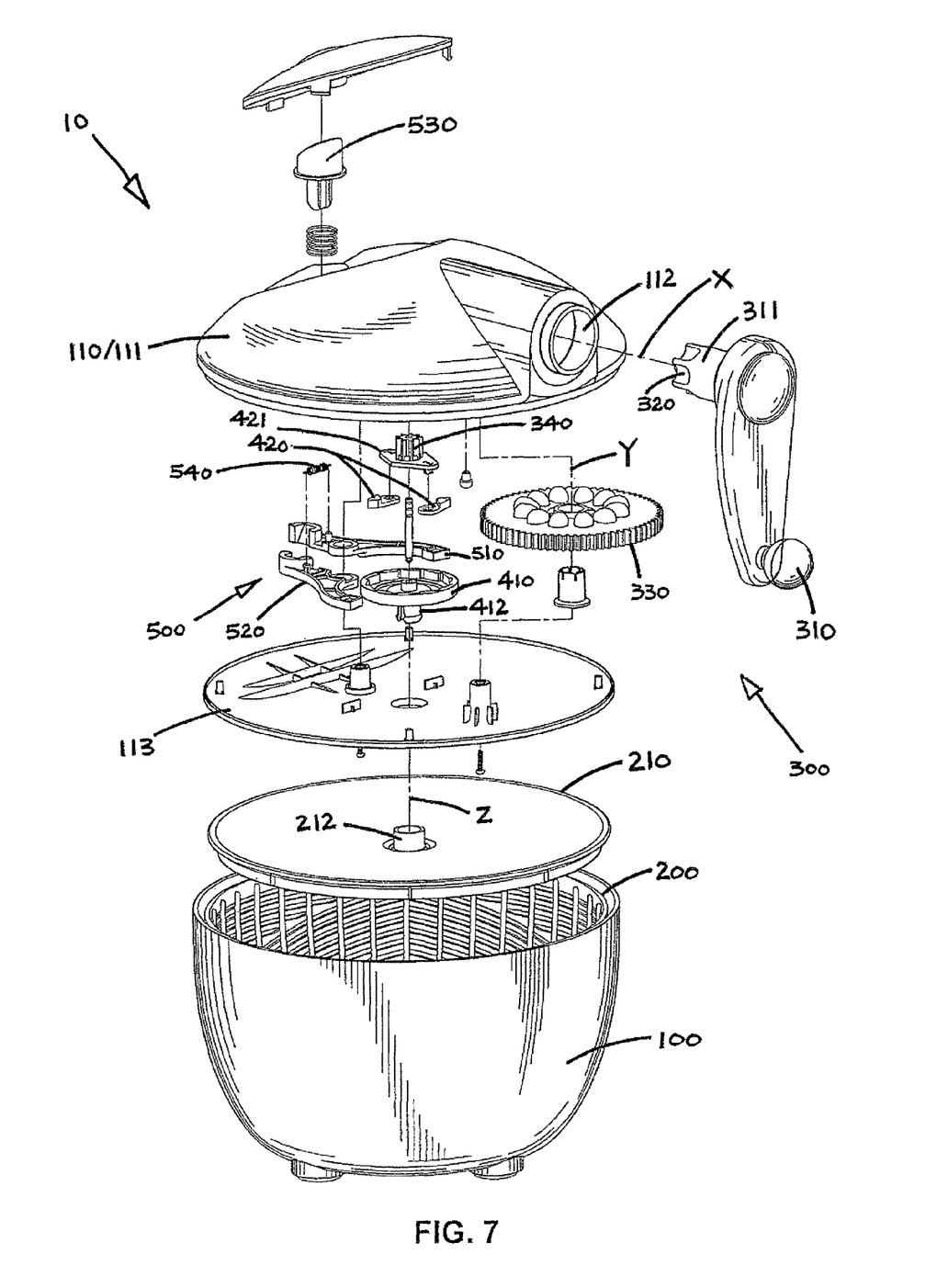
FIG. 7 is an exploded perspective view of the salad spinner of FIG. 1, showing most of its components.
Figure 10:
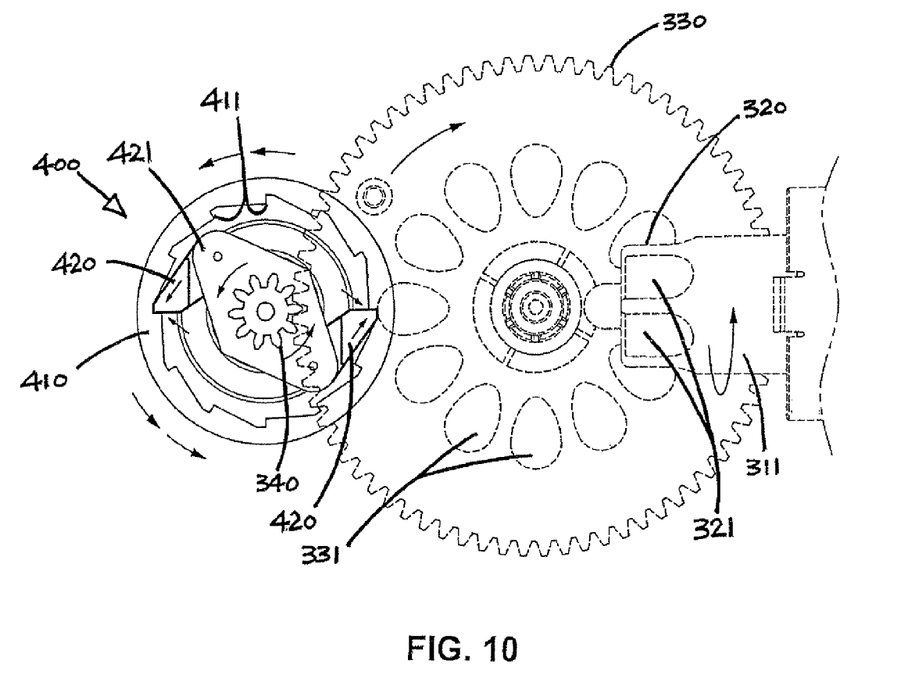
FIG. 10 is a top plan view of the driving components of FIG. 9, with a ratchet device for transmitting rotational drive in only one direction.
Figure 11:
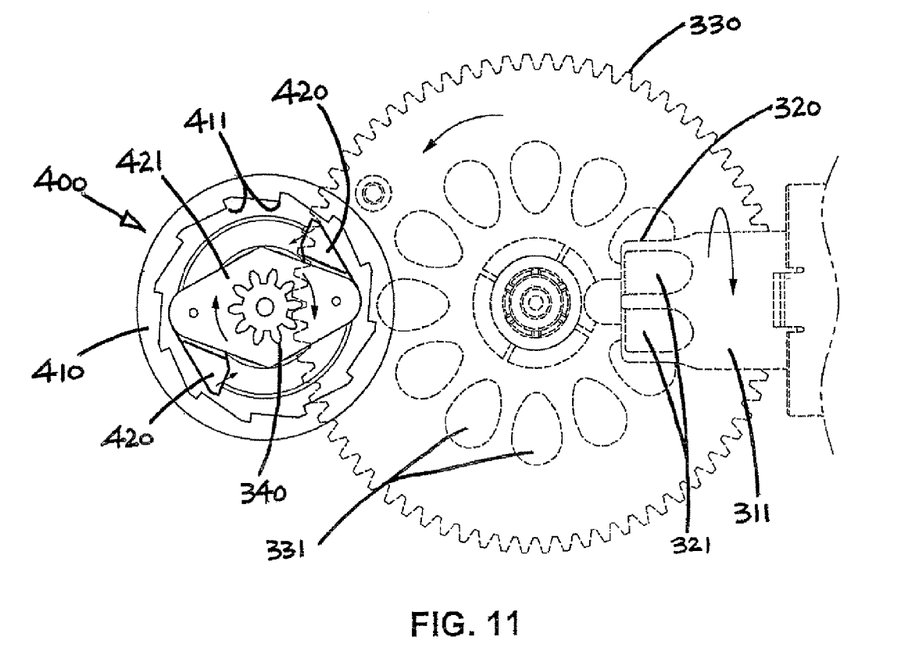
FIG. 11 is a top plan view similar to FIG. 10, showing the ratchet device not transmitting rotational drive in the opposite direction.

In operation, the handle 310 is turned clockwise (FIGS. 5 and 10) to start and rotate the basket 200, whereupon the pawls 420 are turned anti-clockwise to engage or catch the ratchet teeth 411 under the action of centrifugal force and hence rotate the ratchet disc 410 anti-clockwise (FIG. 10). Via the coupling between the ratchet disc 410 and the lid 210, the rotation is thus imparted to the basket 200, which then rotates in the same anti-clockwise direction.

The handle 310 may be turned faster or slower. In the latter case, despite the handle 310 slowing down (or stopping), the basket 200 will continue to rotate under the action of inertia. This is permitted through release or slip action of the ratchet device 400 on reverse, in that the ratchet disc 410 escapes the paws 420 as the paws 420 slow down to effectively turn backwards from the ratchet teeth 411 and hence let go the ratchet disc 410. Continual rotation of the basket 200 is practically unhindered.

To speed up the basket 200, the handle 310 may be turned faster and with harder force applied momentarily every turn. Such intermittent faster harder turning of the handle 310 will result in repeated catch and release actions of the ratchet device 400, whereby the rotational drive is transmitted and applied to the basket 200 repeatedly without hindering its motion such that the basket 200 can only spin faster.

Figure 12:
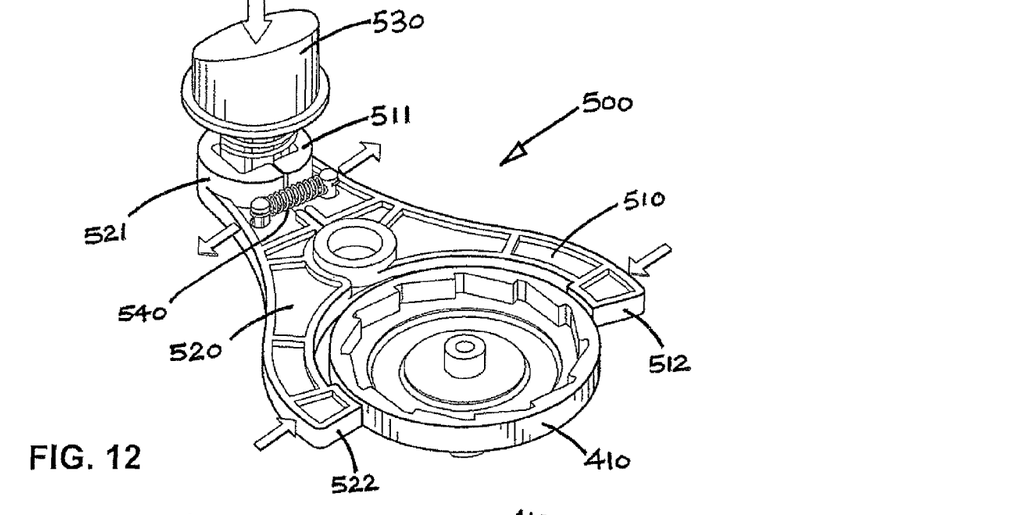
FIG. 12 is a perspective view showing the braking components of FIG. 8 in operation.
Figure 14:
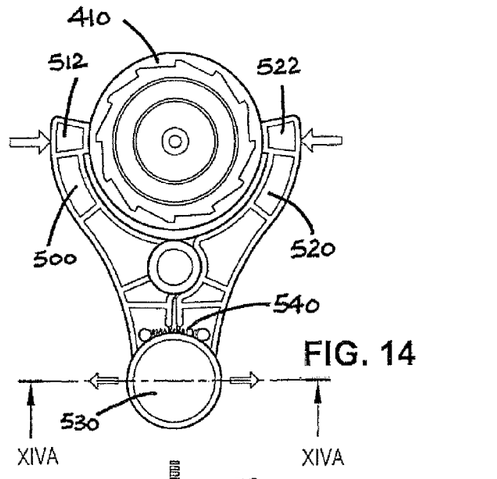
FIG. 14 is a top plan view of the braking components of FIG. 12, in a braking condition.
Figure 14A:
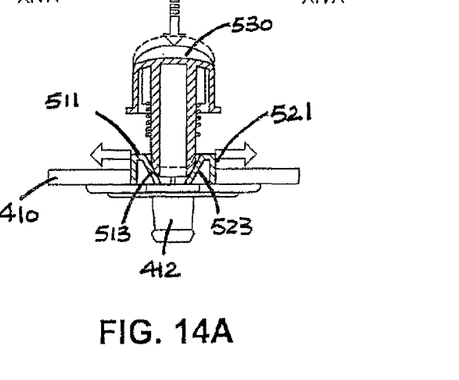
FIG. 14A is a cross-sectional side view of the braking components of FIG. 14, taken along line XIVA-XIVA.

To stop the basket 200 swiftly, the salad spinner 10 incorporates a braking mechanism 500 which comprises a pair of brake shoes 510 and 520 arranged for limited pivotal movement by a press knob 530 exposed on the bowl lid 110, through a cam action upon rear ends 511 and 521 of both brake shoes 510 and 520 (FIGS. 12 and 14A).

More specifically, the shoes 510 and 520 are planar and crooked and are housed inside the bowl lid 110, on opposite sides of and on the same plane as the ratchet disc 410. The shoes 510 and 520 are hinged at about mid-length for limited pivotal movement, with their rear ends 511 and 521 close to each other and their front ends 512 and 522 flanking the ratchet disc 410.

Figure 13:
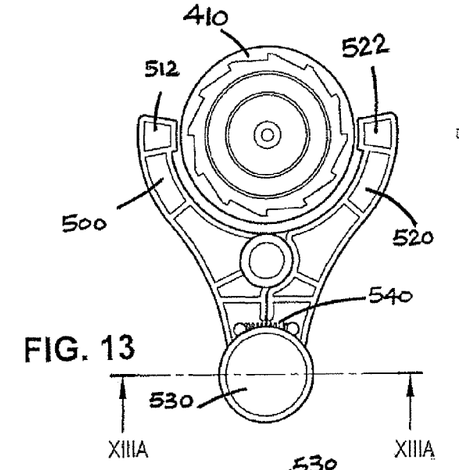
FIG. 13 is a top plan view of the braking components of FIG. 12, in a non-braking condition.
Figure 13A:
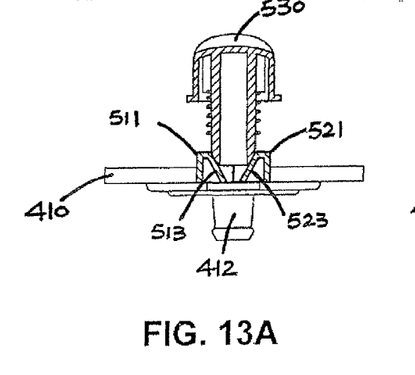
FIG. 13A is a cross-sectional side view of the braking components of FIG. 13, taken along line XIIIA-XIIIA.

The shoes 510 and 520 are resiliently biased outwardly by a small coil spring 540 stretched across their rear ends 511 and 521 such that their front ends 512 and 522 are held off the periphery of the ratchet disc 410 (FIG. 13). In this inoperative position, the shoes' rear ends 511 and 521 abut together, presenting individual sloping surfaces 513 and 523 directly underneath the press knob 530 (FIG. 13A).

Upon depression, the press knob 530 presses upon the sloping surfaces 513 and 523 to spread the rear ends 511 and 521 of both shoes 510 and 520 apart (FIG. 14A) against the action of the spring 540, whereby their front ends 512 and 522 are pressed against the periphery of the ratchet disc 410 to brake the disc 410 by friction (FIG. 14) and hence the basket 200.

Figure 15:
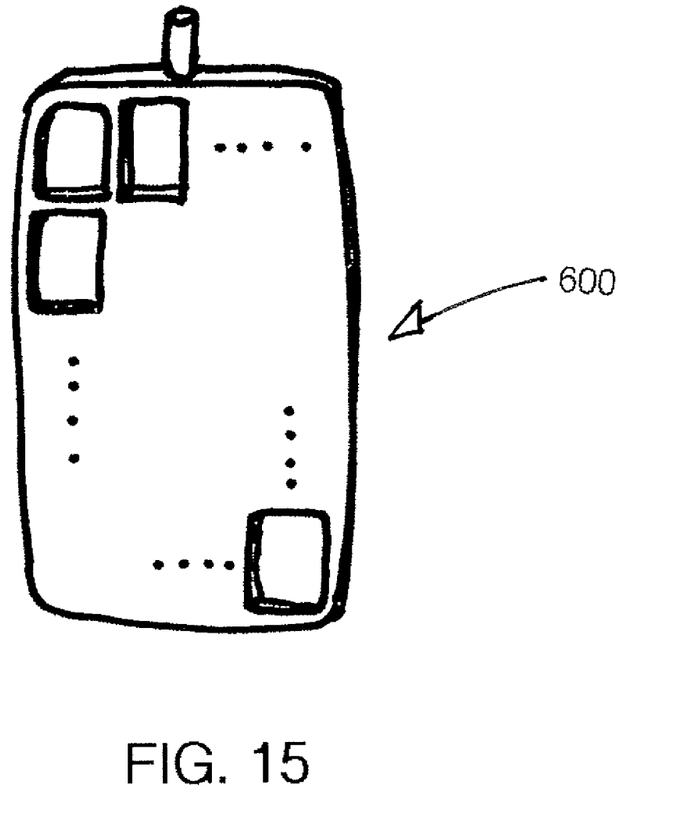
FIG. 15 is a view of a latticed agitator that may be used as part of the food processing device.

It is envisaged that subject food processing device may take any appropriate forms other than a salad spinner as described above. For example, the food processing device may be a mixer for salad dressing or sauces, in which case the operating attachment may be a latticed blade-like agitator 600, as shown in FIG. 15, or a whisk/beater (instead of a basket) arranged to be turned by the drive mechanism to mix food held in the housing.

The invention has been given by way of example only, and various other modifications of and/or alterations to the described embodiment may be made by persons skilled in the art without departing from the scope of the invention as specified in the appended claims.

The invention claimed is:

1. A food processing device comprising:
   a housing having a lid;
   an operating attachment supported in the housing for rotation about an axis of rotation; and
   a drive mechanism supported by the lid for rotating the attachment to process food in the housing, the drive mechanism comprising
   a manually rotatable actuator, and
   a drive transmission system coupling the actuator to the attachment to transmit a rotational driving force applied to the actuator to rotate the attachment, the drive transmission system comprising
   a first rotary member arranged to receive the rotational driving force from the actuator,
   a second rotary member in driving engagement with the first rotary member for receiving a driving force from the first rotary member to rotate the attachment;, wherein the first and second rotary members have corresponding serial formations of respective circular cross-sections that are inter-engageable, one in the other, for transmission of the driving force, and
   a ratchet device in driving engagement with the drive transmission system to enable transmission of the rotational driving force only in one direction, from the actuator to the attachment, upon the actuator rotating in one direction.

2. The food processing device as claimed in claim 1, wherein the serial formations of the first and second rotary members comprise recesses and protrusions, respectively, the protrusions having a circular cross-section matching with and fitting closely in the recesses.

3. The food processing device as claimed in claim 2, wherein the recesses have a partly cylindrical shape.

4. The food processing device as claimed in claim 2, wherein the protrusions are dome-shaped.

5. The food processing device as claimed in claim 4, wherein the protrusions have a partly circular cross-section.

6. The food processing device as claimed in claim 2, wherein the serial formations of one of the first and second rotary members comprise the recesses which are arranged annularly around an axis of rotation of the one of the first and second rotary members and face outwardly from the axis.

7. The food processing device as claimed in claim 6, wherein the one of the first and second rotary members is the first rotary member.

8. The food processing device as claimed in claim 7, wherein the first rotary member comprises a shaft around which the recesses are located, the shaft having an end associated with the actuator.

9. The food processing device as claimed in claim 2, wherein the serial formations of one of the first and second rotary members comprise the protrusions which are arranged annularly around an axis of rotation of the one of the first and second rotary member and face the same side of an imaginary plane extending transversely to the axis.

10. The food processing device as claimed in claim 9, wherein the one of the first and second rotary members is the second rotary member.

11. The food processing device as claimed in claim 10, wherein the second rotary member comprises a gearwheel having a principal side on which the protrusions are located, the gearwheel having peripheral teeth for rotating the attachment.

12. The food processing device as claimed in claim 2, wherein the first rotary member has a smaller number of the serial formations than the second rotary member.

13. The food processing device as claimed in claim 1, wherein the first and second rotary members are supported for rotation about respective axes that extend transversely to each other.

14. The food processing device as claimed in claim 1, wherein the actuator comprises a crank handle.

15. The food processing device as claimed in claim 1, wherein the ratchet device comprises a ratchet member and at least one hinged pawl co-operable with the ratchet member.

16. The food processing device as claimed in claim 15, wherein the ratchet member has circularly arranged skew teeth surrounding the at least one hinged pawl for engagement by the pawl in response to centrifugal force so that the driving force is transmitted only in one direction.

17. The food processing device as claimed in claim 1, wherein the attachment comprises a basket having a lid engageable by the drive mechanism for rotation by the drive mechanism to spin water from food in the basket.

18. A food processing device comprising:
a housing having a lid;
an operating attachment supported in the housing for rotation about an axis of rotation;
a drive mechanism supported by the lid for rotating the attachment to process food in the housing, the drive mechanism comprising
   a manually rotatable actuator, and
   a drive transmission system coupling the actuator to the attachment to transmit a rotational driving force applied to the actuator to rotate the attachment, the drive transmission system comprising
      a first rotary member arranged to receive the rotational driving force from the actuator, and
      a second rotary member in driving engagement with the first rotary member for receiving a driving force from the first rotary member to rotate the attachment, wherein the first and second rotary members have corresponding serial formations of respective circular cross-sections that are inter-engageable, one in the other, for transmission of the driving force;
a braking mechanism for braking rotation of the attachment, the braking mechanism comprising a manual operator and at least one braking member for movement by the operator to brake rotation of the attachment; and
a spring biasing the at least one braking member resiliently into an inoperative position, wherein the braking member is movable by the operator against the action of the spring to an operative position to brake the attachment.

19. The food processing device as claimed in claim 18, wherein the at least one braking member is housed inside the lid, with the operator exposed on the lid.

20. The food processing device as claimed in claim 18, wherein the attachment comprises a basket having a lid engageable by the drive mechanism for rotation by the drive mechanism to spin water from food in the basket.

21. The food processing device as claimed in claim 18, wherein the attachment comprises an agitator engageable by the drive mechanism for rotation by the drive mechanism to agitate food in the basket.

22. A food processing device comprising:
a housing having a lid;
an operating attachment supported in the housing for rotation about an axis of rotation; and
a drive mechanism supported by the lid for rotating the attachment to process food in the housing, the drive mechanism comprising
   a manually rotatable actuator, and
   a drive transmission system coupling the actuator to the attachment to transmit a rotational driving force applied to the actuator to rotate the attachment, the drive transmission system comprising
      a first rotary member arranged to receive the rotational driving force from the actuator, and
      a second rotary member in driving engagement with the first rotary member for receiving a driving force from the first rotary member to rotate the attachment, wherein the first and second rotary members have corresponding serial formations of respective circular cross-sections that are inter-engageable, one in the other, for transmission of the driving force, wherein the attachment comprises an agitator engageable by the drive mechanism for rotation by the drive mechanism to agitate food in the housing.

* * * * *